United States Patent [19]

Deinert

[11] Patent Number: 4,779,412
[45] Date of Patent: Oct. 25, 1988

[54] POWER GENERATION PROCESS USING A GAS TURBINE

[75] Inventor: Jürgen Deinert, Holstein, Fed. Rep. of Germany

[73] Assignee: Rheinische Braunkohlenwerke AG, Cologne, Fed. Rep. of Germany

[21] Appl. No.: 112,571

[22] Filed: Oct. 22, 1987

[30] Foreign Application Priority Data

Oct. 23, 1986 [DE] Fed. Rep. of Germany ....... 3636024

[51] Int. Cl.⁴ .............................................. F02C 3/28
[52] U.S. Cl. .................................. 60/39.02; 60/39.12; 423/237
[58] Field of Search ................. 60/39.02, 39.06, 39.12, 60/723; 48/197; 55/70; 423/237, 239 R, 239 A

[56] References Cited

U.S. PATENT DOCUMENTS

| | | | |
|---|---|---|---|
| 3,661,507 | 5/1972 | Breitbach et al. | 423/237 |
| 3,822,337 | 7/1974 | Wunderlich et al. | 423/237 |
| 4,233,275 | 11/1980 | Kimura et al. | 423/237 |
| 4,273,748 | 6/1981 | Takahashi et al. | 423/237 |
| 4,488,398 | 12/1984 | Noguchi | 60/39.12 |

FOREIGN PATENT DOCUMENTS

| | | |
|---|---|---|
| 3326100 | 2/1985 | France . |
| 3423815 | 1/1986 | France . |
| 3501456 | 7/1986 | France . |
| 3503413 | 8/1986 | France . |
| 59-58116 | 10/1985 | Japan . |

Primary Examiner—Louis J. Casaregola
Attorney, Agent, or Firm—Panitch, Schwarze, Jacobs & Nadel

[57] ABSTRACT

In a power generation process using a gas turbine for conversion of the energy of gas which is produced by the gasification of a fossil carbon-bearing material such as brown coal, the gas is initially cleaned of dust and optionally desulfurised in the hot condition. The gas is then passed to a combustion chamber in which the temperature of the gas is increased by partial reaction of the gas with air and/or oxygen to a temperature of from 1000° to 1500° before the gas is passed through a catalytic fixed bed reactor arranged upstream of the gas turbine combustion chamber. The combustion chamber in which the gas temperature is increased, the fixed bed reactor and the gas turbine combustion chamber may be combined. The fixed bed reactor contains a nickel-bearing catalyst which, at elevated temperatures, is resistant to ageing and resistant to sulfur and compounds thereof.

12 Claims, 2 Drawing Sheets

POWER GENERATION PROCESS USING A GAS TURBINE

BACKGROUND OF THE INVENTION

This invention generally concerns a power generation process using a gas turbine for conversion of the energy of gas, and power plant for carrying out the process. More particularly the invention is concerned with such a process and apparatus which employ gas produced by the gasification of coal in a gasifier.

In coal gasification installations, a low- to medium-calory fuel gas is produced from coal under elevated pressure and at elevated temperature, using an oxygen-bearing medium such as air or steam and oxygen as a gasification agent. The fuel gas produced in that way is particularly suitable for use in combined gas/steam turbine power generating plants. By virtue of the combination of gas and steam turbines, such power generating plants generally have a level of efficiency which is substantially higher than that of conventional power plants with flue gas desulfurisation and denitrogenisation.

German laid-open application (DE-OS) No. 35 01 456 discloses a method of reducing the $SO_2$ and $NO_x$ content of gases which are produced in the gasification of coal and which undergo combustion after desulfurisation in a turbine. In order to achieve a reduction in the amount of $NO_x$ discharged with the exhaust gas and to achieve an increase in the output and performance of the power generating installation by virtue of a lower level of compression energy for the combustion air, it is proposed that combustion of the desulfurised gas take place in the presence of a $CO_2/O_2$ mixture. The use of $CO_2$ on the one hand lowers the combustion temperature and on the other hand reduces the $NO_2$ problem as a practically $No_2$-free exhaust gas is produced. In comparison with air, the amount of $CO_2$ required is lower so that the energy requirement for the $CO_2$-compression step can be reduced.

The known method suffers from a series of disadvantages. Firstly, it is highly uneconomical to operate a combustion process with pure oxygen. Furthermore, recycling crude $CO_2$ by way of the compressor results in a loss in efficiency of the combination plant. Although the recycling of $CO_2$ to the combustion process means that thermal $NO_x$ is not produced, or is produced only in small amounts, on the other hand, due to reaction-kinetic effects, the nitrogen in the fuel is reacted, even at the low temperatures involved, to produce nitrogen oxides which rapidly leave the system so that it becomes impossible to arrive at an equilibrium condition. Reaction-kinetic effects of that kind are predetermined for example by the residence time and the reaction mechanism. The reaction of $NH_3$ or $HCN$ with $O_2$ does not stop at the level of $N_2$ but goes on in the direction of NO and $NO_2$, which is what is precisely to be avoided.

Finally, the known method makes no provision whatsoever for the removal of dust and there are therefore doubts about the technical viability of that method because a dust-laden gas cannot be used and allowed to expand in a gas turbine.

At the same time however, the cleaning of hot gas is known. In such a procedure, the gas is cleaned of dust by means of temperature-resistant and pressure-resistant ceramic filter cartridges and is desulfurised in fixed bed reactors or fluidised bed reactors by reaction with metal oxides. The resulting metal sulfides are then regenerated again. Such a hot gas cleaning process has advantages over gas cleaning processes using low temperatures, because in that way the overall degree of efficiency of power generating processes with a gas turbine can be increased. However, hitherto the known methods of cleaning the hot gas which is in a pressurised condition did not afford any way of adequately removing the nitrogen compounds such as ammonia and hydrogen cyanides which are contained therein. Such compounds must be removed from the exhaust gases after expansion of the gas which has undergone combustion, in the gas turbine, in order to prevent environmental pollution, and that is an expensive operation. A de-$NO_x$ installation which is disposed downstream of the gas turbine requires a relatively high pressure drop because the effective gas volume to be cleaned is about 150 to 200 times greater in comparison with the gas before it has undergone expansion and combustion. In addition, an expensive temperature control arrangement is required in the waste heat and steam generating system. Therefore such a procedure runs counter to the advantages in regard to increasing the level of efficiency, which are achieved with hot gas dust removal and desulfurisation.

SUMMARY OF THE INVENTION

An object of the present invention is to provide a power generation process using a gas turbine to convert the energy of gas, which at least reduces the formation of fuel nitrogen, while influencing the formation of thermal nitrogen, and at the same time increases the level of efficiency of the process.

Another object of the present invention is to provide a power generation process using a gas turbine to convert the energy of gas, without involving very elevated pressures and temperatures.

Yet another object of the present invention is to provide a power plant operating process using a gas turbine for converting the energy of gas into power, which is more broadly acceptable from an environmental point of view than some previous processes.

Still another object of the present invention is to provide a power plant for converting the energy of gas, in an economical fashion without involving major design and structural complications.

In accordance with the present invention, these and other objects are achieved by a power generation process using a gas turbine for converting the energy of gas produced by the gasification of coal such as brown coal, with an oxygen-bearing medium such as air and/or a mixture of oxygen and steam, in a gasifier, the gas, in the hot condition, being successively cleaned of dust, optionally desulfurised and burnt with air in the combustion chamber of the gas turbine whereupon the combustion gases are expanded in the turbine. A portion of the gas is reacted with an oxygen medium such as air and/or oxygen, with an increase in temperature, and the gas is passed by way of a catalytic fixed bed reactor disposed upstream of the turbine combustion chamber, for decomposition of the nitrogen and possibly higher hydrocarbon compounds contained in the gas.

It may be noted that, while the procedure of removal of dust from and desulfurisation of hot gas has partly already been tried on the scale of pilot installations, there has not been hitherto any conception in regard to hot gas denitrogenisation, in particular under a degasification pressure. The proposal of the present invention for effective denitrogenisation in respect of the hot crude gas gives a number of particular advantages. It is possible to reduce the N-bearing component of the gas, by means of commercially available catalysts for decomposition of ammonia. In that situation the reaction takes place in accordance with the following chemical equation:

$$2NH_3 \text{ cat. } N_2 + 3 H_2.$$

Starting from the condition of equilibrium concentration of ammonia in the crude gas from an $O_2$/steam or air gasification operation, high degrees of reaction in respect of ammonia occur with different reaction temperatures and pressues, being of the order of magnitude of between 99.0 and 99.8%.

The hydrogen cyanides contained in the gas are completely broken down under those operating conditions, as follows:

$$2HCN + 2H_2O = CO + N_2 + 3H_2.$$

Higher hydrocarbons undergo almost complete reaction with steam, for example as follows:

$$C_6H_6 + 6H_2 = 6CO + 9H_2$$

$$C_{10}H_8 + 10H_2O = 10CO + 14H_2.$$

The catalyst to be employed has a series of properties which are advantageous in regard to such operating conditions, as follows:

it is preferably nickel-bearing, it is resistant to sulfur at elevated temperatures, it has a high level of resistance to ageing; the service lives are several years, there is no soot formation, chemical equilibrium in respect of ammonia decomposition is achieved with a maximum deviation of 10%.

The dust-free and possibly desulfurised gas is passed to a denitrogenisation reactor comprising a combination of a combustion chamber with a catalytic fixed bed. The gas undergoes partial combustion in the combustion chamber, by virtue of a feed of oxygen and/or air.

The partial combustion usually takes place at the same level of pressure as that at which the gas produced by the gasification operation. In other words, minor pressure losses due to the upstream-disposed equipment for the removal of dust and possibly desulfurisation have practically no effect. On the contrary, the partial reaction of the gas which takes place at the upstream position, with an increase in volume occurring due to the increase in temperature, is particularly suitable for compensating for such pressure losses, thereby advantageously influencing the overall degree of efficiency of the combined power generation process.

In the partial reaction, the temperature level of the combustion gas is raised to the reaction temperature of about 1250° C. The hot gas then flows through the catalyst filling of the denitrogenisation reactor which involves ammonia $NH_3$ and hydrogen cyanide HCN being broken up. The product gas from which harmful nitrogen compounds have been removed passes into the combustion chamber of the gas turbine. In order to simplify the design configuration of the installation, the denitrogenisation reactor may also be combined with or possibly entirely integrated into the combustion chamber which is disposed upstream of the gas turbine.

The catalytic fixed bed reactor used in the process in accordance with the invention provides for a reduction in the nitrogen-bearing components in the crude gas from the coal gasification operation. The degrees of denitrogenisation achieve values of higher than 99.5% for example in the case of crude gas which was produced in a known High Temperature Winkler gasifier at a pressure of 20 bars and using $O_2$/steam as the gasification agent. The maximum deviation from the equilibrium condition found is around 10%. In that case the remaining proportions of N-bearing components are at a level of 19.1 vpm in the gas which is fed to the gas turbine from the combustion chamber thereof. When that gas undergoes combustion in the gas turbine with the usual very high excess of air, then, due to a dilution factor of about 7, the waste gas has an $NO_x$-concentration of about 5.6 mg/$Nm^3$ which is due to the nitrogen in the fuel. That residual content of nitrogen compounds in the waste gas is negligibly low in comparison with the thermal $NO_x$ which is usually produced in the gas turbine combustion chamber.

Further objects, features and advantages of the present invention will be apparent from the following description of a preferred embodiment.

DESCRIPTION OF THE PREFERRED EMBODIMENT

Figure 1:
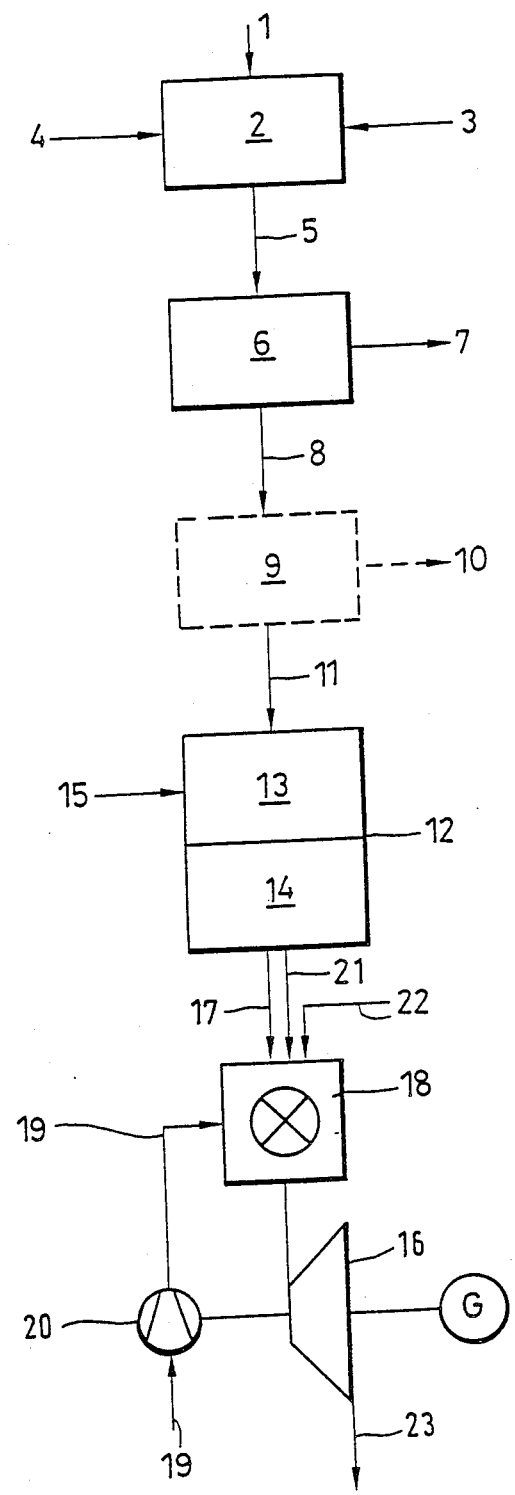
FIG. 1 is a diagrammatic representation of a power generation process using a gas turbine.

Referring firstly to FIG. 1, shown therein is a power generation process using a gas turbine for converting the energy of gas which is produced by the gasification of coal such as brown coal or lignite (herein the term brown coal is used broadly to designate the various kinds of coals that are generally referred to as brown coal or lignite). Pre-dried and crushed brown coal as indicated at 1 is fed to a High Temperature Winkler (HTW) gasifier 2 where it undergoes gasification using an oxygen-gearing medium such as steam/oxygen as indicated at 3 and/or air as indicated at 4. The crude gas 5 which is produced in the gasifier 2 is passed to a chamber 6 where it undergoes an operation for the removal of dust therefrom by means for example of ceramic filter cartridges (not shown) which are resistant to the temperatures and pressures involved. Fine dust is separated from the gas and discharged from the chamber 6, as indicated at 7. The cleaned gas is then possibly fed to a fixed bed reactor 9 within which there occurs a reaction of hydrogen sulfide $H_2S$ with metal oxides, with sulfur being separated out as indicated at 10 while the metal sulfides which are formed are then regenerated again (such regeneration procedure is not shown in FIG. 1). The gas feed to 9 is indicated at 8.

The resulting desulfurised gas 11 is fed at 12 to the denitrogenisation reactor which comprises a first reaction region in the form of a combustion chamber 13 and a second reaction region in the form of a catalytic fixed bed reactor 14. The pre-cleaned gas 11 from the desulfurisation reactor 9 undergoes partial combustion in the combustion chamber 13 of the denitrogenisation reactor 12 by virtue of a feed of an oxygen medium such as air and/or oxygen as indicated at 15. Before passing into the reaction chamber 13, the precleaned gas 11 is at a temperature of around 850° C.; in the reaction with the oxygen and/or air 15, the temperature of the gas is raised to about 1250° C. at which it passes into the catalytic fixed bed reactor 14 where the denitrogenisation reaction takes place. It provides that the ammonia contained in the gas 11 is broken up in the following fashion:

$$2NH_3 = N_2 + 3H_2.$$

The hydrogen cyanides contained in the gas 11 are also broken up by reaction with the steam contained in the crude gas, in the following fashion:

$$2HCN + 2H_2O = CO + N_2 + 3H_2.$$

Each of those operations result in the formation of molecular nitrogen $N_2$ which exhibits inert behaviour within the subsequent power generation process using the gas turbine 16, particularly in regard to combustion of the gas issuing from the fixed bed reactor 14, as indicated at 17.

The catalyst within the catalytic fixed bed in the reactor 14 preferably contains nickel.

In the reaction of the hot gas 11 within the catalytic fixed bed reactor 14, higher hydrocarbons (for example benzene and naphthalene) likewise react with steam, in the following fashion:

$$C_6H_6 + 6H_2O = 6CO + 9H_2$$

$$C_{10}H_8 + 10H_2O = 10CO + 14H_2.$$

The gas which is cleaned of nitrogen compounds within the catalytic fixed bed reactor 14 then passes as a fuel or clean gas 17 into the combustion chamber 18 of a gas turbine 16, where it undergoes combustion together with air which is raised to the necessary operating pressure by the compressor 20 which is coupled to the gas turbine 16. Nitrogen as indicated at 22 is mixed with the clean gas 17 and fed to the combustion chamber 18, the temperatures of which can be so adjusted by the amount of nitrogen 22 supplied, since that nitrogen exibits inert behaviour during the combustion process and the formation of thermal $NO_x$ is reduced, due to the low combustion temperatures involved. Selectively or additionally temperature control in the combustion chamber 18 to at least reduce the formation of thermal nitrogen oxides may also be effected by adding water or steam (not shown). Reference numeral 21 in FIG. 1 represents a feed of molecular nitrogen which leaves the reactor 12, together with the clean gas 17.

The gas which has undergone combustion and which has then been allowed to expand in the gas turbine 16 leaves the gas turbine 16 as waste gas as indicated at 23 and may possibly also be put to use in a subsequent combined power generation process using a steam turbine, in order to utilise the sensible heat contained therein (that step is not shown in FIG. 1).

When the operation of desulfurisation in the desulfurisation reactor 9 in FIG. 1 is not included, then gas 8 which has been freed of dust in the dust removal stage 6 is passed directly into the reaction chamber 13 of the denitrogenisation reactor 12, which is made possible by virtue of the fact that the nickel-bearing catalyst of the catalytic fixed bed reactor 14 is is resistant to sulfur at high temperatures. In no way however does the residual sulfur which still remains in the gas even after a preceding desulfurisation step have a harmful effect on the service life of the preferably nickel-bearing catalyst. The catalyst is also highly resistant to ageing, with its service life being several years. There is also no formation of soot within the catalytic fixed bed reactor 14.

Figure 2:
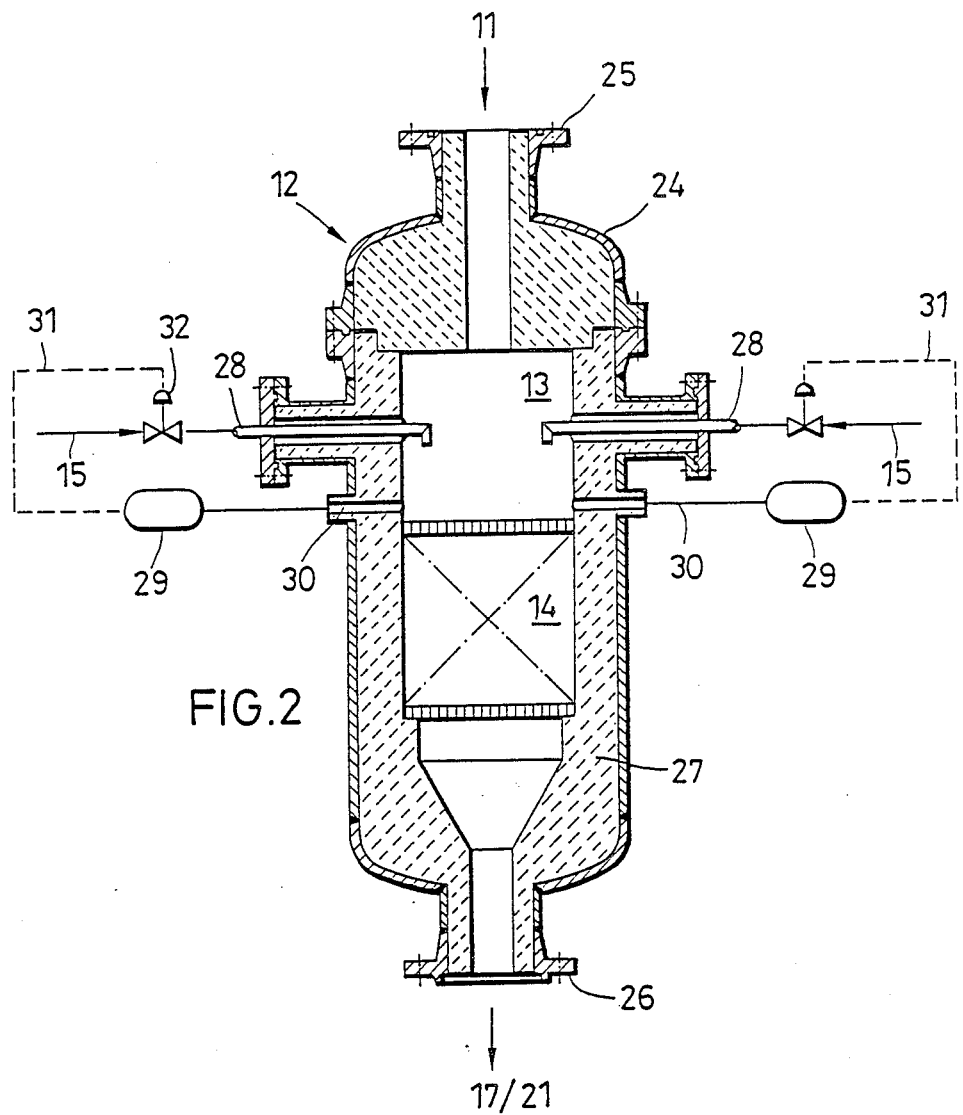
FIG. 2 shows a sectional view of a reactor for denitrogenisation gas.

Referring now to FIG. 2, shown therein is a structural configuration of a denitrogenisation reactor which was described above and indicated at 12 in FIG. 1. As shown in FIG. 2, the reactor 12 comprises a steel casing 24 having an inlet 25 for the gas 11 from which dust has been removed and which has usually been desulfurised, and an outlet 26 for the clean gas 17. In its interior the steel casing 24 is entirely lined by a refractory lining 27. The interior of the reactor 12 is divided into the two chamber regions 13 and 14. Feed connections 28 for feeding air and/or oxygen 15 to the chamber region 13 open into the casing 24, in communication with the chamber region 13. The feed of air and/or oxygen 15 is monitored by a temperature regulator 29 having a probe or sensor at 30 going into the lower part of the reaction region 13, with the output 31 of the temperature regulator 29 operating to control a valve 32 which thus controls a feed of air and/or oxygen 15 to the reaction chamber 13.

In the reaction of the cleaned gas 11 with the air or oxygen 15, the temperature of the gas 11 rises to about 1250° C. within the reaction chamber 13.

It is at the above-indicated temperature of around 1250° C. that the gas 11 then passes into the region of the fixed bed catalyst as indicated at 14, comprising a loose filling of preferably nickel-bearing catalyst carriers. In that step, the ammonia and hydrogen cyanide compounds contained in the hot gas 11 are broken down and molecular nitrogen is formed as indicated at 21 in FIG. 1. The nitrogen 21 then leaves the reactor 12, together with the clean gas 17, through the outlet 26 of the reactor 12.

The reaction situations within the power generation process according to the invention using a gas turbine for converting the energy of gas are represented by means of a Table which is set out hereinafter. The first part of the Table shows the reaction parameters involved in the gasification of brown coal in a HTW-gasifier with a gasification pressure of 20 bars and with a given coal through-put rate. Oxygen and steam are used as the gasification agents in the left-hand column in the Table, while air is used as the gasification agent in the right-hand column. The corresponding resulting gas composition is set out in the second part of the Table.

When that gas is introduced into the denitrogenisation reactor, partial combustion of the gas takes place in the combustion chamber thereof, with 450 Nm³/hour oxygen, with $O_2$/steam gasification, or 3360 Nm³/hour air, in the case of air gasification. That partial combustion operation gives rise to an increase in temperature of the gas from 850° C. to the reaction temperature of 1250° C. which is necessary for the denitrogenisation procedure to take place. In the partial combustion step, it is primarily the methane component of the gas that is reacted, with the degree of denitrogenisation being more than 99%.

The heat required to increase the temperature of the crude gas from the $O_2$/steam gasification operation is supplied by the combustion of about 60% of the amount of methane contained in that gas. In that situation, about 7.6% of the thermal capacity of the gas is converted into sensible heat. The remaining amount of methane, being about 40%, reacts almost completely with the steam which is also to be found in the gas, at the high temperatures in the denitrogenisation reactor, to give CO and $H_2$. The gas composition shown at bottom left in the accompanying Table is to be found at the discharge from the denitrogenisation reactor. That gas composition arises out of the equilibrium condition, which is changed at the elevated temperature, in respect of the water gas reaction:

$$(CO + H_2O = CO_2 + H_2).$$

The amount of heat required for raising the temperature of an air gasification gas cannot be completely covered by the reaction of the amount of methane to be found in the gas, so that there is additionally a requirement for partial conversion of the $H_2$ or CO component. That fact is due inter alia to the high ballast component of nitrogen in the crude gas or in the combustion air respectively; it manifests itself in the necessary conversion of 36% of the thermal capacity of the gas into sensible heat within the combustion chamber of the denitrogenation reactor.

The gas composition set out at bottom right in the accompanying Table occurs in a similar fashion at the dischage from the denitrogenisation reactor.

It will be appreciated that the foregoing description of the process and apparatus in accordance with the principles of the present invention has been set forth solely by way of example and illustration thereof and that various other modifications and alterations may be made therein without thereby departing from the spirit and scope of the invention.

Gasification pressure (bar):

| Coal through-put (t/h) | 5 | 3.5 |
|---|---|---|
| Amount of gas produced ($Nm^3/h$) | 5090 | 3030 |
| Thermal capacity (GJ/h) | 72.1 | 39.33 |
| Max. gas temperature (°C.) | 870 | 868 |
| Gasification agent | $O_2$/steam | Air |

Gas composition (Percent Vol):

| Hydrogen $H_2$ | 27.1 | 13.2 |
|---|---|---|
| Steam $H_2O$ | 20.5 | 7.8 |
| Carbon monoxide CO | 26.5 | 19.9 |
| Carbon dioxide $CO_2$ | 21.6 | 12.7 |
| Methane $CH_4$ | 3.7 | 0.9 |
| Nitrogen $N_2$ | 0.2 | 45.2 |
| Ammonia concentration $NH_3$ | 0.4 | 0.26 |

Denitrogenisation reactor:

| Inlet temperature °C. | 850 | |
|---|---|---|
| Reaction temperature °C. | 1250 | |
| Oxygen * $Nm^3/h$ | 445 | — |
| Air * $Nm^3/h$ | — | 3360 |

Gas composition at outlet of denitrogensation reactor:

| Hydrogen $H_2$ % vol. | 22.2 | 6.2 |
|---|---|---|
| Steam $H_2O$ % Vol. | 29.0 | 16.1 |
| Carbon monoxide CO % Vol. | 32.8 | 17.0 |
| Carbon dioxide $CO_2$ % Vol. | 15.4 | 15.9 |
| Methane $CH_4$ % Vol. | 0.0 | 0.0 |
| Nitrogen $N_2$ % Vol. | 0.6 | 44.8 |
| Ammonia vpm | 17.4 | 27.3 |
| Denitrogenisation level % | 99.6 | 99 |

What is claimed is:

1. In a power generation process using a gas turbine for converting the energy of gas which is produced by the gasification of coal and which in the hot condition is successively cleaned of dust, optionally desulfurised and burnt with air in the combustion chamber of the gas turbine, whereupon the combustion gases are expanded in the turbine, the improvement that a portion of the gas is reacted with an oxygen medium, with an increase in temperature, and the gas is passed by way of a catalytic fixed bed reactor arranged upstream of the turbine combustion chamber, for decomposition of the nitrogen and possibly higher hydrocarbon compounds contained in the gas.

2. A process as set forth in claim 1 wherein said oxygen medium is air.

3. A process as set forth in claim 1 wherein said oxygen medium is oxygen.

4. A process as set forth in claim 1 wherein the initial gas temperature is 850° C. and is increased to a reaction temperature in the range of from 1000° to 1500° C. by at least partial reaction of the components $CH_4$, $H_2$ and CO contained therein with an oxygen medium prior to passing into the catalytic fixed bed reactor.

5. A process as set forth in claim 4 wherein said reaction temperature is about 1250° C.

6. A process as set forth in claim 1 wherein said coal is brown coal and is gasified in a high-temperature reactor with a oxygen-bearing medium.

7. A process as set forth in claim 6 wherein said medium is air.

8. A process as set forth in claim 6 wherein said medium is a mixture of oxygen and steam.

9. A process as set forth in claim 1 wherein said fixed bed reactor contains a nickel-bearing catalyst.

10. In a power plant comprising a gas turbine for converting the chemical energy of gas which is produced by the gasification of coal with an oxygen-bearing medium in a gasifier, means for removing dust from the gas and optionally for desulfurisation thereof in the hot condition and a combustion chamber associated with the gas turbine for combustion of the gas prior to expansion thereof in the gas turbine the improvement that disposed upstream of said combustion chamber of the turbine is a reactor having a reaction chamber for reaction of a portion of said gas with a oxygen medium, and a catalytic fixed bed reactor for splitting up nitrogen and possibly higher hydrocarbon compounds contained in the partially reacted gas.

11. A power plant as set forth in claim 10 wherein said combustion chamber of the turbine and said catalytic fixed reactor are combined together as a common unit.

12. A power plant as set forth in claim 10 wherein said catalytic fixed bed reactor contains a nickel-bearing catalyst.

* * * * *